United States Patent [19]
Galic et al.

[11] Patent Number: 5,866,262
[45] Date of Patent: Feb. 2, 1999

[54] FULLY-HYDROLIZED KETIMINE SILANE/ EPOXIDE SILANE COPOLYMER LIQUID HARDCOATING COMPOSITIONS AND PROCESSES FOR DIPCOATING POLYCARBONATE SPECTACLE LENSES

[75] Inventors: George J. Galic, Columbia Heights; Steven M. Maus, Osseo, both of Minn.

[73] Assignee: Galic Maus Ventures, Columbia Heights, Minn.

[21] Appl. No.: 838,490

[22] Filed: Apr. 7, 1997

Related U.S. Application Data

[63] Continuation-in-part of Ser. No. 543,458, Oct. 16, 1995, abandoned.

[51] Int. Cl.$^6$ .................................................... B32B 9/04
[52] U.S. Cl. ............... 428/447; 106/287.11; 106/287.12; 427/387; 524/868; 524/869
[58] Field of Search .................. 106/287.11, 287.12; 428/447; 524/868, 869; 427/387

[56] References Cited

U.S. PATENT DOCUMENTS

| | | | |
|---|---|---|---|
| 3,961,977 | 6/1976 | Koda | 106/287 SB |
| 4,167,537 | 9/1979 | Taniyama | 525/443 |
| 4,196,014 | 4/1980 | Taniyama | 106/287.13 |
| 4,241,116 | 12/1980 | Taniyama | 427/386 |
| 4,378,250 | 3/1983 | Treadway | 106/287.11 |
| 4,800,122 | 1/1989 | Sallavanti | 428/412 |

*Primary Examiner*—Margaret Glass

[57] ABSTRACT

Dipcoated Rx spectacle lenses require coating scratch resistance, tinting and/or AR coating processes. Chemically, fully-hydrolized copolymers of amino silane and epoxide silane form the chemical backbone of these heat-curing hardcoats, although polyfunctional organic resin modifiers may also "co-cure" into the backbone. The liquid coating copolymer is made in three chemical reactions: (1) fully hydrolizing the two silane Components A&B separately, with a stoichemetric excess of water; (2) ketimine formation, to latently cap the amine functionality; (3) "bodying" the liquid hardcoating to a desired degree of copolymerization, by reacting together the fully hydrolized ketimine silane Component B with the fully hydrolized epoxide-functional silane Component A. Dilution is with the selected resin modifier(s) ketone and alcohol solvent. The resin modifier has at least two organo-functional reactive groups per molecule, of epoxide or melamine or hydroxyl or urea families.

24 Claims, No Drawings

FULLY-HYDROLIZED KETIMINE SILANE/ EPOXIDE SILANE COPOLYMER LIQUID HARDCOATING COMPOSITIONS AND PROCESSES FOR DIPCOATING POLYCARBONATE SPECTACLE LENSES

This application is a Continuation-In-Part of U.S. Ser. No. 08/543,458 originally filed Oct. 16, 1995 (priority date) and now abandoned.

FIELD OF THE INVENTION

The field of the present invention is novel liquid heat-curing siloxane copolymer hardcoating compositions, and chemical synthesis processes thereof, suited for dipcoating scratch-resistant plastic spectacle lenses. More specifically, the present invention is improved compositions and processes for copolymerization of fully-hydrolized ketimine-functional silanes with fully-hydrolized epoxy-functional silanes, along with selected co-reactive organofunctional resin modifiers, forming a liquid dipcoating in blended solvents. Of particular interest is low-cost, high-volume automated dipcoating of polycarbonate injection-molded plastic spectacle lenses and other polycarbonate eyewear (visors, goggles). Most specifically, improved hardcoatings are needed for the fast-growing polycarbonate ophthalmic prescription spectacle lens market, which needs dye-color tintability, water-resistant adhesion, thermal shock/ brittleness resistance, compatibility with anti-reflective vacuum deposition topcoats, in addition to the basic scratch-resistance properties needed.

BACKGROUND OF THE INVENTION

Traditionally, spectacle lenses were made from glass or, more recently, cast thermoset plastics such as CR-39 (allyl diglycol carbonate, cast-polymerized with a peroxide cure). Just in the last two decades, however, the spectacle lens inductry has found they can get better lenses cheaper by highly-automatable injection molding of thermoplastics (most specifically, optical-grade polycarbonate) with highly-automatable liquid dipcoating and curing. For example, twenty years ago the world market for non-vision-corrective ("zero-power" or "plano" lenses) spectacles for industrial workers' safety was still dominated by heat-tempered glass lenses. Now, this market is dominated by hardcoated polycarbonate plano lenses, which can be made for a fraction of the cost of the glass lenses and, at the same time, offer better worker eye protection, by providing far greater breakage resistance (polycarbonate has 10–20 times stronger than glass' impact strength) and better UV-absorbancy protection. The result is that in the U.S., about 85% of all zero-power, industrial safety spectacle lenses are now hardcoated polycarbonate. These lenses' hardcoatings are very much a mature commodity, so lower cost and improved ease of use is important, while maintaining film hardness. General chemistry of these nontintable heat-curing silicone hardcoats are copolymers of monomethyl silane with colloidal silicas. (Applicant Galic is a co-inventor in a co-pending patent application U.S. Ser. No. 08/430,251 now U.S. Pat. No. 5,665,814, on improved versions of same.)

For vision-corrective ophthalmic prescription spectacle lenses, there are other needs and other considerations which have to be met. These hardcoating deficiencies have historically retarded market share growth of polycarbonate Rx spectacle lenses. One such need is for tint-receptivity—the ability for optical laboratories or dispensers to immersion-dye the hardcoated lens in aqueous dye color solutions, to achieve either a lightly-colored fashionable cosmetic tint or, alternatively, a darkly-colored sunglass tint. In the past, lack of tintability of the hardcoatings have held back polycarbonate Rx lenses from widespread acceptance, particularly in the U.S. market, where the majority of Rx lenses are tinted in some way. These tinting operations are conducted in hot (typically, 195°–205° F.) aqueous dye baths, so the hardcoating must be able to accept coloring while, at the same time, maintaining water-resistant adhesion onto the polycarbonate lens substrate and resisting thermal shock/ embrittlement of the coating, such as cracking or crazing, as the lens (at room temperature) is dipped into the hot dye bath, and subsequent rinsing in cool water after removing the hot lens out of the dye bath.

Another requirement for Rx spectacle lens hardcoatings not properly met by the monomethyl silicone or methyl silane/silica copolymer nontintable hardcoats is compatibility with anti-reflective vacuum coatings. Such monomethyl silane/siloxane hardcoats have a refractive index of about 1.43; polycarbonate has a refractive index of 1.586. These anti-reflective coatings are applied by various vacuum deposition processes (such as thermal evaporation, or sputtering, or ion-assisted depositions), and these AR coatings on any plastic lens substrate have much better mechanical durability if a good liquid hardcoating of at least 2–6 microns' thickness is first applied as a base coat before AR coating is deposited. In Japan and other Far East oriental markets, the vast majority of plastic Rx lenses are hardcoated, then AR topcoated in this way. Once AR coated, the lens cannot be tinted, but in these markets, a much smaller percentage of Rx lenses are colored at all (typically, less than 20%). Similarly, in Europe, a majority of Rx glass and high index plastic lenses are AR coated, and relatively fewer are tinted colored. Due to the refractive index mismatch of the monomethyl-silane-based coatings with polycarbonate, relatively poorer anti-reflective coating performance results from such an AR-coated/monomethyl silicone-coated polycarbonate lens. Therefore, a hardcoating having a refractive index much closer to that of polycarbonate is desirable as a base coat for AR-coated polycarbonate Rx lenses. AR coating also involves thermally cycling processes, so brittleness is a worry, and although the AR coating film is very thin (far less than 1 micron), it is also very brittle, thus further stressing the hardcoat and substrate boundary layer adhesions and water resistance bonds. Thus, the thermal shock of the water boil test (lens surface temp from room temp to 100° C. nearly instantaneously) and/or cyclic humidity tests are found to be predictive of field failures due to cracking or delamination of these coatings.

PRIOR ART

Now, looking at the chemical family of hardcoating copolymers formed by reaction of epoxide-functional silanes and amino-functional silanes, Koda (U.S. Pat. No. 3,961,977, issued Jun. 8, 1976) is believed to be the first to anticipate that such a composition could be useful as a hardcoating onto molded plastic articles. Koda's composition discloses a partially hydrolized polysiloxane formed from limited water, restricted to hydrolize only 10–40% of the available alkoxy groups on silicon. However, to prevent premature gelation, these partially hydrolized Koda compositions were applied in very dilute liquid solutions. Koda Example 1 was only 6% solids, having a viscosity of about 5 cps; Koda Example 2 was 11.2% solids and 6.3 cps viscosity. Although Koda showed examples of dipcoated polycarbonate and conducted scratch resistance tests thereon, Koda is silent on suitability for use in Rx spectacle lenses. In fact, when fully oven-cured to maximum hardness, Koda compositions are essentially nontintable.

Taniyama (U.S. Pat. No. 4,167,537; U.S. Pat. No. 4,241,116; U.S. Pat. No. 4,196,014) follow Koda and claim to be improvements thereon. The first Taniyama patent cited above teaches no pre-hydrolysis of the silanes before reacting them together; the second Taniyama patent does have an example of a pre-hydrolysis of only "3% of total methoxy" on silicon; the third Taniyama patent is silent on the subject. Like Koda, Taniyama is silent on the tintability and AR coating compatibility and other aspects, and, in general, is silent on suitability for prescription polycarbonate spectacle lens use.

Treadway (U.S. Pat. No. 4,378,250, issued Mar. 29, 1983) claims improvement on the Koda and Taniyama prior art by, first, reacting the amino-functional silane group with a member of the ketone family to form the ketimine, thus "capping" the amine functionality to reduce its tendency to prematurely react with the epoxide functionality to cause uncontrollable viscosity increases and/or gelation of the liquid coating compositions. Treadway's compositions are claimed to be able to increase the degree of partial hydrolysis from a minimum of 40% (the upper limit of Koda) to as high as 80% of the stoichemetric amount of water required to complete hydrolysis (3 moles of water for each mole of trialkoxy silane), yet Treadway claims to have acceptable stability in the liquid state for utility. Throughout Treadway's specifications and claims, every reference made to hydrolysis stipulates a partial hydrolysis of the silane. His best mode calls for 60–80% partial hydrolysis (Column 10, Lines 7–15), and Treadway says abrasion resistance is "critically dependent upon the amount of hydrolysis" (Column 11, Lines 62–69). Treadway also mentions the ketimine "decomposes by absorption of moisture" (Column 9, Lines 51–55). Treadway is silent on the consequences of even higher levels of hydrolysis, but, inasmuch as Treadway claims improved coating stability versus prior art, premature gelation may have been why he did not go higher in percent hydrolysis. Although Treadway contemplated use on plastic lenses, his substrate was CR-39, never polycarbonate. Treadway's method of applying coating to the plastic substrate was by flowcoating or drawdown with wire-wound rod, never by dipcoating. Treadway is silent on matters of tintability and/or compatibility with AR topcoats.

Sallavanti (U.S. Pat. No. 4,800,122, issued Jan. 24, 1989) is the most recent prior art of a ketimine copolymer with epoxide-functional silane, but Sallavanti substitutes polyfunctional organic amine in place of Treadway's amino-functional silane, as raw material for the ketimine formation reaction. Unlike Treadway, Sallavanti is drawn to suitability for dipcoating with polycarbonate spectacle lenses, and tintability thereof, and at least enough water resistance to retain adhesion during and after the tinting bath operation. Sallavanti is silent on the subject of coating bath stability, ease of use, or other processing limitations. However, Sallavanti chemical stability is suspect, as seen by his suggestion to use the coating at below freezing temperatures: ". . . Typically, the solution is maintained at a working temperature of 30° F." (Column 5, lines 32–33). Traditional ways of cooling a circulating bath, such as use of core/shell-type heat exchanger with chilled water has a practical lower limit of 45° F. Obviously, it is not possible to maintain bath temperature through any heat exchanger with any circulating chilled water at 30° F. Inevitably, a dip tank of this type would have to have an immersion coil with a circulating, phase-change refrigerant in order to maintain such a low 30° F. temperature of the bath. Such cooling coils also thereby become a great opportunity for bath contamination and a problem for maintaining bath purity, as they will soon become coated with gel flakes. Also, as soon as a lens is withdrawn with a coating of 30° F., the surrounding air must be very, very dry or else "blush" will occur. Prevention of this lens fogging would require that air in the coating drydown area be kept at a dew point well below 30° F., which is hardly commonplace, even in air conditioned space, so extraordinary dehumidification needs may he required for implementation of Sallavanti.

OBJECTIVES OF THE PRESENT INVENTION

It is one objective of the present invention to make shelf-stable fully-hydrolized epoxide silane (Component 'A') and ketimine -amino silane (Component 'B') components which can be subsequently mixed together just prior to use to make up the main filmforming constituent in a liquid dipbath suitable for polycarbonate spectacle lens, and to make this 2-silane copolymer hardcoating with the lowest possible manufacturing costs, by using the 2-silane copolymer "reaction products" without any subsequent step of stripping off excess solvent or unreacted ingredients.

It is another objective of the present invention to make these 2-silane copolymer compositions which heat-cure to transparent films having good hardness and steel-wool scratch resistance but improved resistance to fogging or blush or solvent etch problems characteristically observed with coatings of the cited prior art when they are dipcoated onto polycarbonate lenses, and to eliminate any need to use desiccant air-drying equipment where the liquid dipcoating is applied and devolatilized, and be able to successfully dry down these coating films.

It is another objective of the present invention to make these 2-silane copolymer compositions with improved resistance to brittle failure (coating cracking or crazing) and/or loss of adhesion to the polycarbonate lens substrate, when subjected to thermal shock and moisture.

It is another objective of the present invention to make these 2-silane copolymer compositions, when formulated with selected polyfunctional organic resin modifiers which co-cure, to form transparent films onto polycarbonate spectacle lenses having good hardness and steel-wool scratch resistance but also are readily tinted by immersion into dye pots.

It is another objective of the present invention to make these 2-silane copolymer compositions, when formulated with selected other polyfunctional organic resin modifiers which co-cure, to form transparent films onto polycarbonate spectacle lenses having good hardness and steel-wool scratch resistance but also are well-suited as basecoats under vacuum deposited antireflective multilayer deposition coatings.

SUMMARY OF THE INVENTION

For reasons mentioned above, the special needs of dip-coated polycarbonate Rx spectacle lenses require not merely cured coating film hardness and scratch resistance, but compatibility with subsequent tinting and/or AR coating processes. Chemically, fully-hydrolized copolymers of amino silane and epoxide silane form the basic chemical backbone of the heat-curing hardcoats of the present invention, although polyfunctional organic resin modifiers which may also "co-cure" into the backbone during crosslinking are also contemplated so as to add especially desired properties to the cured hardcoating film.

The present invention preferrably will prepare the liquid coating copolymer to be made in three chemical reactions:

1. hydrolysis of the two silane components separately (for later reaction together):
    a) fully hydrolizing with a stoichemetric excess of water an epoxide-functional silane having substantially trialkoxy groups on silicon
    b) fully hydrolizing with a stoichemetric excess water an amino-functional silane having substantially trialkoxy groups on silicon
2. ketimine formation, by reacting the fully hydrolized amino-functional silane component with stoichemetrically excess molar amounts of a ketone volatile solvent, to form a fully hydrolized ketimine silane component having latent capped amine functionality;
3. "bodying" the liquid hardcoating to a desired degree of copolymerization, by reacting together the fully hydrolized ketimine silane component with the fully hydrolized epoxide-functional silane component.

These first 2 reactions can be performed out of order listed above. For example, the second reaction, of ketimine formation, has been performed before the first reaction, of fully hydrolizing the amino-functional silane. Or the second reaction and the first reaction might be done essentially simultaneously. But no improvement was found, to change this order.

For reasons cited herein, it is preferred to dilute this basic reaction mixture of the 2 components with at least one polyfunctional co-reactive film-forming organic resin modifier, and it is perhaps easiest to do this at the end of these 3 reactions, when it is also perhaps easiest to dilute down this liquid hardcoating to the desired % solids concentration with additional ketone volatile solvent but also at least some alcohol having a slower rate of evaporation than the chosen ketone volatile solvent. It would be optional to add the polyfunctional co-reactive film-forming organic resin modifier to one or both of the reactants BEFORE the 3 reactions have all taken place. Such has been done by Applicants, but no advantage was found to doing so. Also, it would be optional but not preferred to pre-dilute the reactants with these solvents BEFORE the 3 reactions have all taken place. To do so merely slows down the reactions, and so was found to not have offsetting advantages.

In actual use, the lens manufacturer will have on hand in inventory the 2 fully-hydrolyzed silane components, both of which have been found to have good longterm storage life (typically 6–12 months has been found satisfactory). The lens manufacturer will typically mix just enough of these 2 to form the amount of liquid hardcoating dipbath expected to be used in the very nearterm production schedule (even when stored in freezers, the mixed bath will last only 1–2 months typically), and none will be left standing idle at room temperature any longer than needed.

Preferably, a "bodying" reaction step is performed to the mix of the 2 components (the fully-hydrolized epoxide silane (Component 'A') and ketimine-amino silane (Component 'B')) components, rather than just using the mix immediately, by prior-to-use reacting together the two previously-prepared liquid components comprising the fully-hydrolized amino silane (after conversion to ketimine silane) with the fully-hydrolized epoxide silane. This "bodying" step is a copolymerization to the desired degree of polymerization (molecular number), and it will proceed at room temperature (in hours), or can be heat accelerated (in minutes). Equivalent results can be obtained either way, if the same formulations are bodied to the same extent (monitored by viscosity rise, at constant % solids).

Relatively minor amounts of other film-forming ingredients can be incorporated into the formulation to enhance aspects such as tintability and film toughness or wet adhesion. Still, the bulk mechanical properties of the dipcoated lens' coating film is predominantly that of this copolymer of the two silanes.

Such hardcoats are highly crosslinked in order to give high scratch resistance, but they also provide a desirably higher refractive index (about 1.49–1.51, depending on the formulation ratios), and toughness or resiliency of the hardcoating film, as well as water resistant adhesion.

When formulated with certain co-reactive resin modifiers, tintability is obtained with somewhat reduced film hardness. The polyfunctional co-reactive film-forming organic resin modifier is selected from a chemical grouping wherein each member of the chemical grouping has at least two organo-functional reactive groups per molecule. These two (or more) organo-functional reactive groups are of epoxide organo-functionalities, so that this polyfunctional co-reactive film-forming organic resin modifier is capable of co-reacting during the 'C Stage' heat-curing of the devolatized film, in order to minimize reduction in crosslink density while acquiring improved tintability and/or improved water-resistant adhesion and/or resistance to thermal-shock/brittleness in the cured film.

DETAILED DESCRIPTION OF THE INVENTION

The basic composition of the present invention's liquid hardcoating solutions are:

a. nonvolatile film-forming constituents copolymerized together, partially in the liquid dipcoating state and partially during the heat-curing crosslinking reaction, comprising:
   i) A fully-hydrolized epoxide-functional silane;
   ii) A fully-hydrolized amino-functional silane converted into ketimine silane by reaction with at least stoichemetrically excess ketone; and:
b. volatile solvent blend consisting mainly of ketone but also an alcohol having slower evaporation rate than the ketone as tail solvent.

In preferred embodiments, at least one polyfunctional organic resin modifier is selected from a group having at least two or more organo-functional groups per molecule, the organo-functional groups being epoxide or melamine or hydroxyl or urea. The selected resin modifier(s) can be added after mixing the fully-hydrolized epoxide silane (Component 'A') and ketimine -amino silane (Component 'B') components, or optionally added into the appropriate Component. For example, the selected di- or tri-functional epoxide resin modifiers have been added to Component A with no adverse effect on storage stability nor cured film performance.

The coating compositions of the present invention can be applied by any conventional process, including dip, flow, spin, and spray, although for high-volume automated coating of both sides of the optical thermoplastic spectacle lens substrates at minimum costs, dipping is usually preferred.

1. Full Hydrolysis of Silane Components

Hawley's Condensed Chemical Dictionary (12th Edition; Van Nostrand Reinhold Co., NYC; copyright 1993; ISBN 0-442-01131-8), on page 618 defines hydrolysis as . . . "A chemical reaction in which water reacts with another substance to form two or more new substances. This involves ionization of the water molecule as well as splitting of the compound hydrolyzed . . . ".

As used herein, "fully hydrolized" shall mean that the hydrolysis reaction has been conducted in the presence of a stoichemetrically sufficient (100%) or excess (>100%)

amount of water. Conversely, "partially hydrolized" shall mean that the hydrolysis reaction has been conducted in the presence of less than a stoichemetrically sufficient (<100%) amount of water.

Theoretically, any trialkoxy silane may be expected to form a gel when fully hydrolized with a stoichemetrically sufficient or excess amount of water, under pH conditions suitable for hydrolysis (for nonpolar silanes such as epoxide, textbook conditions for hydrolysis are a moderately acid pH of 3–5; for amino-functional silanes, hydrolysis immediately occurs on the alkaline side self-catalytically). That is because each of these hydrolyzable alkoxy (Si—OR) groups are capable to react in the known way to:

firstly, split off alcohol (ROH) as byproduct of hydrolysis and form silanol groups (Si—OH), then secondly, to undergo condensation reaction with pH catalyst to form siloxane bonds between adjacent silane molecules (2 Si—OH or 1 Si—OH+1 Si—OR→Si—O—Si).

Thus, with trialkoxy silanes, the potential exists for growth of insoluble three-dimensional network, i.e., gelation, unless the hydrolysis reaction has been conducted in the presence of less than a stoichemetrically sufficient (<100%) amount of water. For example, monomethyl trialkoxy silanes under suitable pH conditions for full hydrolysis and auto-condensation, proceed to rapid gelation.

If the silanes were dialkoxy instead of trialkoxy, 100% hydrolysis and condensation to siloxane bonds would he expected to form a linear polymer much like a silicone oil or silicone rubber gum polymer, depending upon the molecular number or degree of polymerization. However, it is well known that only highly crosslinked polymer coatings will be hard and scratch resistant, and such a linear silicone polymer would form very soft coatings. Even copolymers of dialkoxy and trialkoxy silanes cohydrolized together are too soft to be good hardcoatings, unless the dialkoxy is very small ratio (<10 mole %). So, whereas using dialkoxy silanes would reduce gel formation, so would they also reduce cured film hardness by a like proportion.

Surprisingly, full hydrolysis of the trialkoxy-functional amino silane and epoxy silanes of the present invention does not result in useless gelation. Specifically, the preferred silanes (glycidoxy propyl trimethoxy silane and amino propyl triethoxy silane) have been hydrolized with excess water, while confirming that hydrolysis reaction has taken place—by observing exotherms in the reaction mixture—yet quite good long-term stability at room-temperature storage has been found, without solvent dilution of the reaction mixture. For example, using a 104% stoichemetric ratio of water (3.12 moles per mole of trialkoxy silane) has produced a reaction product of low viscosity liquid (without any solvent or other diluents), which shows no harmful viscosity increase after over 6 months at room temperature storage conditions, for both fully hydrolized amino silane ("neat") and fully hydrolized epoxy silane ("neat"). Subsequently, even higher amounts of excess water have been used successfully, with similar results (110°% stoichemetric amounts of water in undiluted silane form a clear, low-viscosity liquid of good room-temperature storage stability). Both of these tests have been repeatedly reproduced by Applicant.

How to explain these empirical findings requires revision of conventional theories. In his prior employment at Dow Corning Corporation, a leading silicon manufacturer who makes both amino-functional and epoxide-functional silane, Applicant Galic frequently worked with quite dilute (typically, 1% or less concentration in water) of these silanes, used as adhesion-promoting coupling primers or coupling agents for fiberglass reinforced plastics. During that time, in Applicant Galic private communication with Dr. Edwin P. Plueddemann, who was the inventor of several such silane coupling agents, Dr. Plueddemann hypothesized that, with a sufficiently long alkyl chain (such as propyl) between silicon and amine groups, it is possible that the organo-functional group would "tail over" to form some chemical coordinate with the silicon end of the molecule, thus, allowing relatively stable, long-term dilute aqueous solutions of such trialkoxy silanes without gelation or precipitation occurring. Extrapolating from that model of a non-covalent cyclization of organo-functional and silicon-functional ends of the molecule, perhaps the result is the functional equivalent of additional steric hindrance. If so, even though most likely all alkoxy groups are completely hydrolized under the stipulated pH conditions, availability for silanol condensation reactions to form ultimately a homopolymer gel may be sufficiently sterically hindered by this mechanism to prevent gelation and, instead, to form a relatively lower-molecular-weight, relatively linear homopolymer, as observed empirically.

Another possible explanation for this surprising result might be that not all commercial grades of the silane coupling agent may be equally stable when fully hydrolized in accordance with the present invention. Specifically, for example, it is possible that certain "technical grades" of commercially available aminopropyl triethoxy silane may contain too great an amount of unreacted ammonia as an impurity. Such technical grades may have a purity specification of only 96%. Applicants recommend use of the commercially available distilled-grade (specification of the 99% or greater purity) as a way to prevent this from happening. The relative price of the technical grade versus the more pure distilled grade of aminopropyl triethoxy silane is only about 20% more expensive.

For example, Huls America is a leading commercial manufacturer of these silanes. Huls' product designation for the distilled 99+% purity is AMEO-P; the technical grade of 96% purity is designated AMEO-T. ( Huls offers only distilled-grade glycidoxy propyl trimethoxy silane, under a designation GLYMO.)

Most recent hydrolysis tests by Applicants on technical versus purified/distilled grades of aminosilane have showed:

1. the peak exotherm is a higher temperature, as hatch size increases (ranging from testtube to 2 liter vessel).
2. both types of aminosilane, when being hydrolyzed, turn cloudy soon after addition of water with mixing. Grains of white gels can be seen while exotherm is still rising, but within 10–20 minutes after peak exotherm has passed, the reaction mixture clears to form a mostly homogeneous transparent liquid of low-medium viscosity. Small amounts of easily-gravity-filtered insolubles typically remain after 24 hours in the fully hydrolyzed technical grade of aminosilane, but no significant insolubles are seen in the fully hydrolyzed distilled grade of aminosilane.
3. although the exotherm tends to be stronger with the technical grade, and more insolubles are formed, it is a workable starting material too.

It is impossible for Applicants to explain with theoretical certainty the surprising empirical finding of good room-temperature storage stability of these fully-hydrolyzed silane prepolymers. Nor can one know if any of the prior art patentees who worked with these partially hydrolized silanes ever attempted to fully hydrolize the silanes, nor, if such work was attempted, what result was obtained. However, given the emphasis that these prior art patentees place on finding the right degree of partial hydrolysis %, it is believed that, most likely, they never tried full hydrolysis since there was no theoretical basis to believe anything would result except premature gelation. Because of the strong exotherm seen with the aminosilane, even at low % partial hydrolysis, these prior art patentees are believed to have feared trying very high % partial hydrolysis, expecting gels. Treadway examples shows 95% hydrolysis with epoxide silane, but only 80% with amino silane. Treadway was concerned that higher than 80% hydrolysis of amino silane could result in stability problems, thus defeating the claimed beneficial purpose of his invention over the prior art. Refer to Treadway Columns 5–6, especially . . . "silanols are relatively unstable and tend to condense spontaneously" (Column 6, Lines 9–10) and ". . . partial hydrolysis of the amino alkyl alkoxy silane precusor may be performed by adding enough water to hydrolize greater than 40% of the available alkoxy group, and an approximately equal amount of water soluable alcohol, such as ethanol or methanol, may be added to aid solubility" (Col. 6, lines 43–48). He chooses to predilute the amino silane before hydrolysis, as shown in Example 1 and in his claim 22, Step A. Applicants submit that a chemist fearful of possible gelation would consider reducing the reactants' concentration by predilution. Please note that throughout Treadway's disclosure specification and claims, he consistently calls every hydrolysis a partial hydrolysis, except for the very last claim, claim 22, wherein the amino silane is specified to be prediluted before hydrolysis.

Sallavanti chose to use a polyamine substitute in place of hydrolyzed amino silane, and shows 95% hydrolyzed epoxide silane. Why not use a polyepoxide substitute in place of hydrolyzed epoxide silane, and combine with 95% hydrolyzed amino silane ? It would be an obvious analogy. Applicants submit that this is rather strong circumstantial evidence that both Sallavanti's and Treadway's concern for gelation and instability of the reaction mixture would occur under conditions of amino silane's full hydrolysis with stoichemetric excess water. Perhaps if they did ever try full hydrolysis of amino silane, they saw the strong exotherm and cloudy mix with white grains of gels, and dumped the liquid reaction mixture before it could solidify inside the vessel, thus never seeing that at the final equilibrated state a stable clear liquid reaction product is formed.

Therefore, Applicants would say that a stable and useable liquid Component B after full hydrolysis of the amino silane is surprising. Applicants certainly do not consider full hydrolysis and partial hydrolysis of the amino silane to be patentably the same.

2. Bodying Reactions & Monitoring Molecular Growth

"Bodying" is a term used in paints and thermoset resins, wherein the prepolymer average molecule is grown in size by chemical reaction, so as to control flowout during product usage. Such a paint would be less prone to sagging or running during coating flowout and drydown when applied as a liquid film, for better user processability. Final cured film properties are typically not affected.

As used herein, "bodying" refers to copolymerization between the two silane components (the fully-hydrolyzed epoxide silane (Component 'A') and the fully-hydrolyzed ketimine -amino silane (Component 'B')), after mixing within a liquid state, to attain a desired prepolymer molecular size. There are 2 reactions which can lead to such an increase in prepolymer molecular size:

(a) reaction between adjacent silane functional groups (silanol SiOH or alkoxy SiOR), into condensation reaction to form even more siloxane (Si—O—Si) bonds.

(b) reaction between adjacent organofunctional groups (epoxide on silane with amine/ketimine on silane; the active hydrogen of the amino opening the 3-membered oxirane ring of the epoxide), in the well-known epoxyamine condensation reaction (the chemical basis for common 2-part room-temperature-curing paints and adhesives).

Although not wishing to be bound by theory, Applicants believe that very little of the growth in molecular size observed in bodying as employed in the present invention comes from reaction (a), and most comes from reaction (b). Apparently, after undergoing hydrolysis with stoichemetrically excess water in optimal pH conditions as specified in the preparation of shelf-stable liquids Component A and B, any remaining silane functional groups are not strongly reactive to further form siloxane at room temperature storage conditions. Were this not so, the observed months-long shelf life with minimal increase in viscosity could not be attained. This sort of silane-siloxane equilibrium at room temperature is known to be shifted forward, when driven by strong heating (>>100° C.) in presence of pH catalyst, toward maximal siloxane bond formation, during the well-known heatcuring step of crosslinkable thermoset polysiloxane resins.

Surprisingly, Applicants have found that the preferred embodiments of the present invention need to employ at least some substantial bodying reaction between the fully-hydrolized epoxide silane (Component 'A') and the fully-hydrolized ketimine-amino silane (Component 'B') silane functional groups. This is in contrast with the teachings of Treadway (U.S. Pat. No. 4,378,250; Column 10, Lines 3–18, and specifically, . . . "Within the more preferred amount of hydrolysis range (e.g., about 60–80%) little or no aging time is necessary." Since the present invention is fully hydrolyzed (greater than 100%), this Treadway citation would have one believe that an instantly prepared mix should give good hardcoating results, but that was found by Applicants' experimental tests not to be the case. Refer to Examples 6,7, 8a–8d, and 9a–9d herein. Bodying of the present invention's liquid hardcoating mixtures of the two components together can be achieved by merely room-temperature aging (at least for one hour, and, more preferably, overnight—about 16 hours, or more). Equivalent prepolymerization in the bodying reaction can be much more quickly achieved by mixing together the 2 previously-fully-hydrolyzed silanes, forming the ketimine, and warming on a hotplate up to 50° C. so as to partially destabilize the ketimine, then holding the reaction mixture at that 50° C. temperature for 3–5 minutes, followed by immediate quenching with chilled ketone solvent, as described herein, in Examples 3, 4, 5, 13.

Since bodying refers to molecular weight buildup within the liquid dipcoating mixture before being applied onto a lens substrate, some tracking of this parameter is needed. However, measuring molecular weight in conventional ways of analytical chemistry (such as chromatography columns) is problem-prone, because of the inherent chemical reactivity of the ketimine and silane groups whenever the diluting solvents become evaporated:

(a) the amine-to-ketimine formation reaction is reversible. Ketimine is favored in the presence of excess ketone, but when this excess ketone is allowed to be evaporated or is driven off (i.e. by heating), the ketimine breaks down quickly and the resulting ketone given off also evaporates away, to further shift the reaction back toward the free amine.

(b) the free amine's uncapped active hydrogen can now react, fast and irreversibly, with the epoxide, even at room temperature; the reaction goes even faster when concentrations of the reactive groups increase (this happens as the volatile solvent evaporates off; typically less than 30% by weight of the liquid coating is nonvolatile % solids) or with any elevated-temperature heating.

(c) silane coupling agents have inherent affinity to glass or other siliceous or inorganic surfaces, to which they bond tenaceously.

In short, anytime these coatings are wetted out as films onto a surface, and the volatile solvent fraction evaporates, a gel is very quickly formed (in less than 5 minutes). Determination of molecular weight (MW) becomes a problem of "shooting at a fast-moving target", and a messy one at that. The usual procedures for MW don't lend themselves well to this chemistry.

For these reasons, Applicants find it not possible to directly measure and define limitation of the exact MW range of the bodying reaction. However, it is quite reproducible when conducted in the same concentrations, times and temperatures. Thus, at standard ambient conditions of room temperature (nominal 25° C.; 1 Bar atmospheric pressure), bodying of less than one (1) hour has been found to always be inadequate to pass the Applicants' performance test ( dipcoated polycarbonate lenses must not craze or lose adhesion after 15 minutes immersion in boiling water), even at wide ranges of % solids (higher o solids=higher concentration of reactants, so faster bodying reaction rates). Bodying is fastest when the reaction mix is just the fully-hydrolized epoxide silane (Component 'A') and the fully-hydrolized ketimine -amino silane (Component 'B') silane, without diluent solvents. Treadway's examples are not of this undiluted kind; any of his bodying is conducted with coatings diluted to "ready to use" concentrations. Refer to Example 14 herein, comparing Treadway vs. Applicants compositions with differing degrees of bodying, and comparative performance test results thereon.

From these tests, Applicants find that any bodying reaction which produces less molecular weight prepolymer (in Component AB') than that achieved by bodying 1 hour at room temperature will be inadequate to pass the Applicants' performance test ( dipcoated polycarbonate lenses must not craze or lose adhesion after 15 minutes immersion in boiling water).

In contrast, Treadway Example 6 employs prehydrolized silanes of 2.3:1 mole ratios amino silane/water and 2.93:1 mole ratio epoxide silane/water, prediluted with solvent to its ultimate percent solids, then mixed together and used without any apparent bodying at room temperature ... "the reaction product quickly formed therein". Treadway Example 19 provided simultaneous hydrolysis of the ketimine silane and epoxy silane monomers at a ... "molar ratio of water per siloxane group of 0.68" (in other words, well within the preferred range of 60–80% specified by Treadway's best mode). Then, ... "The coating composition was allowed to age for about one hour." From Treadway's own teachings and examples, a limitation is At found that Treadway bodying is one hour or less. Thus, Treadway is said to teach away from Applicants' findings that substantially greater bodying is required in order to pass the previously mentioned performance test of 15 minutes' water boil. Applicants' use of polyepoxidefunctional resin modifiers are preferred, but the test data show that even when these are used in Applicants' best-mode Example 3 formula using room temperature bodying, or in Treadway's Example 19, all those compositions still fail if room-temperature bodying is employed at 1 hour or less.

Applicants' finding of criticality for greater bodying than taught by Treadway is further surprising in view of the conventional practice of bodying in paints. That is, bodying in paints is used to control flowout when applied as a liquid film, for better user processability; final cured paint film properties are typically not affected. But in the Applicants' final cured hardcoating film properties on polycarbonate lenses are very adversely affected, unless at least minimum degree of polymerization through bodying reaction has been exceeded.

At any given percent-solids concentration, bodying is most conveniently monitored by measuring the viscosity of a constant-solids solution at a constant temperature (i.e. room temperature). Viscosity increase then becomes proportional to molecular weight increase of the film-forming constituents therein. In dipcoating baths of the present invention, at typical 20–25% solids concentrations which give useful dipbath stability for lens production, a quite low-viscosity mix is obtained. With little (<1 hour) or no bodying, a water-like (about 1.0–1.5 centistoke) viscosity is measured on an mixture of all ingredients at typical 20–25% solids. Applicants prefer greater bodying than that. Preferably, it will be bodied to a 2.0–7.0 cs range. In such low viscosity ranges, a Brookfield-type, rotary-spindle viscometer may be less convenient and requires very large spindles. An alternative measure uses glass "U capillary tube" (Cannon Fenske No. 150-size Routine Viscometer, from Cole Parmer of Niles, Ill.). Stopwatch readings (in elapsed time, in seconds) correlate with Brookfield-type viscometry in centistokes by a simple math formula (seconds are multiplied by 0.035 to=Cs.)

To determine the average molecular size or degree of bodying or aging of the dipcoating bath, viscosity is the key parameter, along with percent solids. Since evaporation gradually increases the percent-solids concentration in a dip bath, and since makeup solvent must periodically be added, the percent solids needs to monitored also. This is most conveniently done with thermogravimetric analysis (using a small aluminum disposable weighing dish, a 10 g liquid sample is dried to nonvolatile residue at 125° C. oven temperature in 30 minutes), and weight loss is calculated minus tare weight, to give percent nonvolatile solids. For dipbath use, Applicants' preferred compositions should be maintained at 17–27% solids, and most preferably at 20–23% range, with viscosity at 2.1–4.2 range.

3. Ketimine Bond Formation & Dissolution (Drydown Conditions)

The purpose of forming the ketimine is to temporarily cap the active hydrogen of the primary-amino-functional silane. The ketimine bond is favored when a large excess concentration of the ketone is present, and when temperatures are minimal (room temperature or below, as would be the case in a chilled dip bath or, for longer-term storage, in a freezer).

Conversely, ketimine bond dissolution is favored when the excess ketone concentration is removed (by evaporation, during devolatilization of the wet coating film dip-applied onto the polycarbonate lens substrate), and also by heating to temperatures above ambient (progressively-increasing oven temperatures are commonly used). For example, as we will describe herein, although room temperature drydown might be conceivably used, Applicants' experimental work shows that both the water-resistant bond properties and mechanical film properties of such "RT-dry" dip coatings are inferior to oven-accelerated "setting" of the dipcoating film drydown. A first elevated temperature (typically 40°–90° C.) may be employed in a convective-curing oven immediately after dipcoating applies the wet film. During this first stage of evaporation, all excess ketone volatile solvent is substantially removed very quickly, accelerating the ketimine dissolution rates and thus freeing the latent capped amino functionality of the silane, so as to cause reaction of the second Component B with the epoxide functionality of the first Component A.

During this same heat-accelerated drydown, further reaction of the silicon functionality on the silane components can possibly occur, but such a Si—O—Si condensation reaction is known to be relatively slow during such low (below 90° C.) coating surface temperatures. Since the time to convert the freshly applied dipcoated wet film to a "dry to the touch", tackfree gelled (but not yet fully crosslinked) state can be less than 5 minutes with the preferred coating formulations disclosed herein, it is believed by Applicants' that the predominant chemical reaction during this "B stage" gelled-film-formation step is between the primary amino-functional alkyl siline+the strained three-membered oxirane ring of the epoxide-functional silane. When high concentrations of such reactants are present at room temperature (or even at mildly elevated temperatures such as the preferred 50°–80° C. oven drydown conditions), such amine-epoxide reaction rates are known to be quite fast. Such chemistry is the basis for room-temperature-curing, two-part epoxy paints and adhesives, after all. In contrast, absent such specialized organo-metallic tin or titanate catalysts (such as stannous chloride or tetraisopropoxy titanate), the Si—O—Si condensation reaction between the 2 fully hydrolized trialkoxy silanes (having residual Si—OR and predominantly Si—OH groups) is known to be very slow at mildly elevated temperatures or at ambient temperatures.

The prior art references are silent on such mechanistic aspects of ketimine-epoxide copolymerization. The prior art also fails to teach that improved hardcoating film properties can be obtained by drydown to B stage cure at an elevated temperature above ambient. Applicants' have found experimentally significant differences exist using the same starting point chemical formulations and dipping parameters, which are surprising in view of the prior art failure to teach such a phenomenon. During subsequent C-stage curing to maximize crosslinking, not only do intermolecular bonds between the amino and epoxide functionalities take place, but also it is important to form as many bonds as possible between the silicon ends of the 2 molecules, each of which has three such bonding sites theoretically (with the trialkoxy silanes preferred in the present invention). Although not wishing to be bond by theory, it is believed by Applicants' that the surprising benefits of heat-accelerated drydown (vs. RT airdry) in forming a B-stage coating film leads to a preferred molecular orientation in the resulting high-molecular-weight, three-dimensional silane copolymer which perhaps minimizes the steric hindrance. In a simplified model, if each silane molecule is visualized as having formed a chemical covalent bond between its organo-functional (amino-to-epoxide) end, and at least one chemically covalent Si—O—Si siloxane bond between its silicon-functional end with an adjacent silane molecule, then having only those two bonds would predict a substantially linear copolymer which would have little hardness and be rubbery in nature. Thus, to have the desired-grade film hardness, a higher crosslink density of the resulting copolymer is essential. Therefore, at least one of the two remaining potential siloxane bond-forming sites on the trialkoxy silicone-functionality end is important. It is in this regard that Applicants' believe that better cured-film properties are accounted for by a preferred molecular orientation to minimize steric hindrance in the gelled film state achieved by accelerated heating versus slower tackfree times achieved during ambient air drydown. In addition, the coating-bond-to-substrate polycarbonate lens is superior with the heat-accelerated drydown.

4. Conditions For Full Cure ('C Stage')

Once the ketimine bond dissolution has reverted to free primary amino functionality by dissolution, copolymerization proceeds quite rapidly. A more elevated surface temperature is preferred for fastest crosslinking rates. Whereas 50°–8° C. works well for solvent drydown and coating film gelation, 110°–130° C. is preferred to maximize crosslink density of the fully cured film in the shortest time. Higher oven temperatures than 135° C. are less preferred, since the polycarbonate substrate has a glass transition temperature of about 296° F. (146° C.), and if such surface temperatures exceed that, the lens can lose its shape stability and become optically warped or aberrated, and thus unsaleable. (Alternative heating sources such as long-wave infrared radiant heating, or inert fluorocarbon vapor-condensation phase-change heating (such as 3M Company's Fluoroinert(™) can reduce these hours to mere minutes; the latter has been shown to fully cure Applicants' coatings in 5–10 minutes' times).

This conversion (from a gelled, tackfree "B stage" to a "C stage" coating having roost of its ultimate machanical hardness), can be achieved in less than one hour at 125° C. convective oven temperatures, but to get best water-resistant adhesion and toughness takes hours longer (total 2–6 hours, preferably 4 hours at 125° C.).

5. Silane Ratios

In theory, a maximum crosslinking density is achieved at equimolar (1:1) ratio concentrations of the epoxide-silane and ketimine-silane entities. Such ratios could be 0.5:1 to 4:1, but Applicants' have found such wide ranges are impractical, since mechanical film properties are undesirable beyond a range of about 0.8:1 to 2:1, and more preferably, are within a range of 1:1 and 1.5:1. Absent any of the resin modifiers described herein, and with only the two silane Components A and B becoming the film-former, Applicants have found that the scratch resistance of hardcoating films containing more moles of amino-silane than of epoxide silane have a less desirable coefficient of surface friction, as observed by the frictional drag force felt when rubbing steel wool under light finger pressure onto such coated lenses. An example so tested was with an epoxide:amine mole ratio of 0.9:1. Conversely, a preferred embodiment uses a ratio of about 1.2:1 to give very high crosslink densities and film hardness, yet at the same time, impart a smooth, slippery feel to the surface. Applicants also have found that, absent resin modifiers described herein, hardcoated lenses of the present invention having substantially less than 1:1 mole ratio of epoxide silane to amino silane to be more prone to brittle failure of the coating film and poorer wet adhesion retention.

6. Resin Modifiers

As described so far, the crosslinking reaction takes place solely between the 2 silane molecules of the two-component mix. However, preferred embodiments of the present invention also include organo-reactive polyfunctional organic resin modifiers which are capable of participation in this same crosslinking reaction. Such resin modifiers are selected from the group of polyfunctional chemicals which are able to react with either primary amine or with epoxide organo-functional entities in the presence of heat. Such resin modifier molecules must possess at least two such organo-functional groups per molecule in order to keep crosslink density at its maximum, which is a requirement for good film hardness of the hardcoating. Any other non-organofunctional or mono-organo-functional resin modifiers or additives which would be incorporated into this formulation of the present invention should be kept to very low (less than 5 parts-per-hundred resin, or "phr") concentrations. Typically, the preferred resin modifiers having two or three such functional groups, which react either with primary amine or epoxide, will be used at a concentration above 5 phr and as much as 40 phr. Specific chemical examples of such modifiers and their concentrations are given in formulations disclosed herein.

Selection of resin modifier depends upon what properties of the cured film need to be enhanced. For use as base coat for antireflective topcoats, the basic 2-silane copolymer of the present invention have been found to be marginal when used alone, but when combined with Applicants' selected resin modifier, very improved film toughness and flexibility (without substantial loss in steel wool scratch resistance) and much improved wet adhesive bonding to polycarbonate substrates is observed. Di-functional or tri-functional epoxide resin modifiers are preferred for these enhanced properties. Concentration of such epoxide-functional resin modifiers can range from 10:1 to 2:1 ratio by weight of the resin modifier to Component A. A more preferred range is 8:1 to 4:1 weight ratio, for the di- and tri-functional epoxide resin modifiers listed in Example 3 and 13. These resin modifiers are selected from a group of di- and tri-glycidyl ether derivitives of di- and tri-functional aliphatic alcohols and glycols, including such glycidyl substituents derivatized on ethylene glycol, neopentyl glycol, and propylene glycol. Other di-glycidyl ethers formed with resourcinol, with trimethyol ethane or propane, or castor oil, or aliphatic polyol. Of particular interest is a line of commercially available Heloxy Modifiers from Shell Chemical Company, Houston, Tex.; Modifier 67 (diglycidyl ether of 1,4 butane diol), Heloxy Modifier 107 (diglycidyl ether of cyclohexane dimethynol) and Heloxy Modifier 48 (trimethyolpropane triglycidyl ether). Monofunctional epoxide resin modifiers are chemically compatible with the coatings of the present invention, but are not preferred because they provide flexibility at greater sacrifice of crosslink density, resulting in poorer tradeoff in the balance between toughness of the coating film and steel wool scratch resistance.

(For similar reasons, dialkoxy-functional silane coupling agents such as the commercially available CG6710 from Huls America is less preferred than the trialkoxy-functional CG6720 "GLYMO", because of its detrimental effect on crosslink density. CG6710 is a diethoxy monomethyl substituted glycidoxy propyl silane, in contrast to CG6720 being a trimethoxy substituted glycidoxy propyl silane. A similar analogy holds for the amino-functional silanes CA0742 (diethoxy methyl substituted aminopropyl silane) versus CA0750 "AMEO", the preferred triethoxy substituted aminopropyl silane from Huls.

When used in higher concentrations (4:1 or greater), these di- and tri-epoxide-functional modifiers also contribute a noticeable amount of tintability in dye baths.

7. Solvents

Solvents for the coatings of the present invention are predominantly ketones, along with at least one alcohol of a slower evaporation rate than the selected ketone, thereby performing the function of the "tail solvent" (being the last to evaporate). Of the ketone family, most preferred is methyl ethyl ketone (MEK), although others can be used, including acetone, methyl isobutyl ketone, and diacetone alcohol.

Alcohols can range from the simple aliphatic alcohols (including methanol, ethanol, isopropanol, n-butanol, or isobutanol), as well as the glycol ether family. A specially preferred tail solvent has been found to be diacetone alcohol (DAA), which combines the carbonyl of a ketone with the hydroxyl of an alcohol.

As a tail solvent, it has very high soluability for the Applicants' filmformer resins and has a preferred evaporation rate, as the "last to leave". It also seems to enhance adhesion to polycarbonate lens substrates and to minimizing blush problems during drydown. It is preferably present at a level of 3–10°% of the total coating formulation in its "ready-to-use" state. Diacetone alcohol was found to be preferred over ordinary aliphatic alcohols such as butanol, 1-methoxy-2-propanol, or Cellosolve (alkoxy ethanol) alcohols or their esters, or commonly available ketones, for its desirable balance of hydrogen bonding, polarity, and miscibility.

8. Misc. Formulary & Storage

No supplementary catalyst is required. Devolatilization of the liquid hardcoating with heat uncaps the ketimine and that heating step assists in copolymerizing the uncapped aminofunctional and epoxide-functional groups together.

The use of leveling or wetting agents improves flow-out and smoothness of the coating. Such a surfactant is preferably Fluorad FC-430 (a non-ionic fluorinated alkyl ester made by 3M Co., St. Paul, Minn.), used at a typical concentration of 0.01–0.1 PHR (parts hundred resin), but alternatively a silicone-glycol copolymer such as DC 190 made by Dow Corning Corp., Midland, Mich.) could be used.

The storage and dip-bath stability of the coating compositions of the present invention, as expected from the prior art cited, is limited at best, once the 2 Components A & B are mixed. Only low temperature (i.e. freezer storage) and low concentration (i.e. reducing % solids by dilution, preferably with ketone solvent so as to improve ketimine stability) can greatly retard this mix from its gradual march toward gellation, which can take place within as short as 1–3 days at ambient temperature without circulation and filtration, or <2 months in freezer storage. Nevertheless, under normal use and freezer storage when not in use, the dipcoating compositions of the present invention will be useful, since high volume automated lens dipcoating will consume the coating at a rate faster than its autopolymerization reactions taking it toward gelation. By continual replenishment of the dipbath with relatively freshly prepared solutions bodied just enough for use, automated dipcoating operations can run around the clock indefinitely, without having to discard the dipbath.

9. Coating Film Performance Testing a. Steel wool rubbing is the Rx lens industry's consensus choice for a scratch resistant test. Coatings of the present invention were tested in a mechanized test apparatus wherein the lens is mounted convex face up in a horizontal holder. Above the lens is a shaft having on one end a cupped holder for a pad of steel wool, which rests upon the lens surface. On the other end of the shaft is a platform for loading weights, so the steel wool pad can be pressed against the lens surface under a known load. The rubbing action is imparted by an eccentric cam driven by an electric motor, to provide a reciprocating "rocking motion" of the shaft, at low speeds. Each 360-degree revolution of the eccentric cam produces one back-and-forth reciprocating rubbing stroke under the shaft. By a cycle counter or even manual counting of the strokes, a reproducible level of steel wool rubbing is imparted onto the lens surface. For comparative test purposes herein, five such back-and-forth strokes were employed by Applicants.

b. "Wet" testing. Hardcoated plastic spectacle lenses have been widely used now for nearly 20 years, and during that history, many field failures have occurred due to coating brittleness or adhesive bond failure onto the substrate in wet conditions. Lenses being colored at a dispenser encounter the heated dye bath, which can cause such failures. Even if such lenses are not to be colored at all, there still is risk of this type of failure in everyday use. For example, in winter weather, when spectacle lenses coming in from outdoors go from below freezing temperature to room temperature, contact with relatively humid indoor air causes immediate fogging as moisture condenses onto the relatively cold lens surface. This thermal cycling and thermal shock can simultaneously cause cracking if brittleness is in the nature of the coating, as well as peeling and delamination, if a weak bond between coating and substrate exists. To simulate these, a 20-minute immersion in boiling water is done. The room-temperature lenses are dropped directly into the hot boiling water, which provides some thermal shock. Then, after time is elapsed and the lenses are dried and cooled back to room temperature, they are inspected for cracking or crazing (a sign of excessive brittleness) and then tested in accordance with ASTM4-D-3359 test method, in a crosshatch adhesion test.

The boiling water test is a more severe test than the dye bath, and it is faster to run and quicker to get feedback than a cyclic humidity test, which takes days. The typical cyclic humidity test places the coated lens samples into a sealed vessel which has sufficient liquid water to maintain a saturated water vapor when the vessel is closed, yet the platform on which the lens rests avoids any liquid contact with the water contained below. One test cycle starts when the test vessel is placed into a lab oven for 8 hours at 60° C. (140° F.), then removed and cooled to room temperature for 16 hours. At the end of each cycle, the container is opened, all lenses are inspected, any failures are visually noted, and adhesion tests are run. A second cycle of 8 hours at 60° C., and 16 hours at room temperature follow, and so on. To minimize risk of field failures (especially with AR-coated lenses), passing three cycles without crazing or delamination is desired.

Preparation of specific formulations of the present invention are now given in the Examples below:

EXAMPLE 1

Preparation of Component A
(Fully-Hydrolized Epoxide Silane)

Three different batches, each with different stoichemetric excess amounts of water, were prepared in accordance with the table below:

| % H$_2$O | GLYMO (g) | H$_2$O (g) | 0.1N HCl (g) |
|---|---|---|---|
| 101% | 681.7 g | 152.3 g | 5.0 g |
| 104% | 625.0 g | 143.5 g | 5.0 g |
| 110% | 777.0 g | 190.2 g | 5.0 g |

These three batches had mole ratios of 3.03:1, 3.12:1, and 3.30:1 respectively, of water to glycidoxy propyl trimethoxy silane (GLYMO). In each case, the weighed amount of silane is charged into the reaction vessel, followed by addition of the weighed amount of acidified water. Different methods of addition have been employed, ranging from slow addition with mild stirring, faster addition with more vigorous stirring, and also dumping the whole amount of water in with no stirring, then immediately vigorously shaking the sealed vessel for 1 minute. None of these methods of addition resulted in gelation, nor any noticeable difference in the resulting Component A. In each case, the hydrolysis reaction is exothermic, as measured temperature typically goes from ambient to above 30° C. in 30 seconds or less. It usually takes 3–6 minutes for the peak exotherm (40°–45° C. to be reached, and thereafter the hazy reaction mixture becomes clearer. Within about 20 minutes, the mix is cooling and completely clear, and is allowed to age and equilibrate for a period of 24 hours at room temperature, before being used in the coatings. When % solids is run by weight loss in oven, typical Component A=62% nonvolatile solids. Retained samples after 6 months show no tendency toward gel formation nor noticeable viscosity increase.

EXAMPLE 2

Preparation of Component B
(Fully-Hydrolized Amino Silane)

Three different batches, each with different stoichemetric excess amounts of water, were prepared in accordance with the table below:

| % H$_2$O | AMEO (g) | H$_2$O (g) |
|---|---|---|
| 101% | 512 g | 126.1 g |
| 104% | 599 g | 152.0 g |
| 110% | 649 g | 174.3 g |

These three example batches are mole ratios of 3.03:1, 3.12:1, and 3.30:1 respectively, of water to aminopropyl trimethoxy silane. The hydrolysis of AMEO is self-catalyzed on the basic pH side, and is more strongly exothermic than hydrolysis of the epoxide silane. Although both quickly rise from ambient to above 30° C. in less than 30 seconds, the AMEO/water mix takes longer to reach a peak exotherm (typically about 12 minutes), and the peak exotherm temperature is higher (about 65° C.). After reaching this peak, the hazy mixtures become clear, and as before, it is allowed to cool to room temperature and age for an additional 24 hours before use in the coating formulation. 43% nonvolative solids by weight loss is typical, since the alcohol byproduct of hydrolysis is of a larger molecular weight (ethanol from AMEO versus methanol from GLYMO). Retained samples are free of gel and show no visible increase in viscosity after 6 months' room temperature aging.

EXAMPLE 3

Best Mode for Basecoat for AR Vacuum Topcoat
(Best Resistance to Brittle Failure or Wet Adhesion Loss)

Heat-accelerated bodying is employed in this preparation, but room temperature aging for 16–36 hours is believed to be equivalent. First, to form the ketimine, 400 g of Component B is charged into a reaction vessel equipped with a removable heat source and magnetic stirring, and 400 g methyl ethyl ketone (MEK) is added with vigorous stirring and heating. When the reaction reaches 33° C. (taking about 6 minutes to do so), then 500 g of preweighed Component A is quickly added, and heating with vigorous stirring is resumed until the mix reaches 50° C. (taking about 2–2.5 minutes to do so), at which time the heat source is immediately removed, but vigorous stirring is maintained and a timer is set for 5:00 minutes. When that time elapses, 850 g of chilled preweighed MEK is added very quickly to quench the bodying reaction, and the reaction mixture drops to less than 30° C. within 10 seconds of the addition. (Heat bodying must be controlled; in one testrun, the mix was heated to 68° C. instead of the 50° C. target, then by the time 5:00 minutes had elapsed, an irreversible gel had formed.)

A solvent blend is prepared in a separate container, with its contents being 125 g diepoxide-functional resin modifier (Heloxy 107 or equivalent), dispersed in 220 g ethanol and 70 g diacetone alcohol, along with 1.8 g FC430 surfactant. The contents of this separate container are then added to the reaction mixture after quenching and mixed well, and it is ready for immediate use as a dipcoating. This formulation has a calculated mole ratio of epoxide to amine silanes of 1.18:1, and a weight ratio of 4:1 of Component A to Heloxy modifier. Typical is viscosity is about 1:00–1:10 minutes with the Cannon Fenske viscometer or about 2.1 cs., and is about 21% nonvolatile solids.

The "Example 3"-dipcoated polycarbonate lenses were clear and smooth, and of good appearance, after 60° C. oven drydown (<10 minutes tackfree time). After C stage full cure, very good film hardness was seen in steel wool test with low frictional drag. 10 minutes dyeing gave 55% Total light Transmission ("% TLT"). Perfect 100% tape adhesion with crosshatch was found after 10, 20, 30 and 40 minutes "instant-drop" (for maximum thermal shock) immersion in boiling water. "Control" lenses of 2 types of commercially-available hardcoated polycarbonate Rx spectacle lenses both showed light hairline cracks or "craze" in 10 or 20 minutes, which generally got worse with prolonged boiling.

The "Example 3"-dipcoated polycarbonate lenses were subjected to 5 full cycles of the Cyclic Humidity test, and passed craze-free, with perfect 100% tape adhesion with crosshatch. "Control" lenses of 2 types of commercially-available hardcoated polycarbonate Rx spectacle lenses both showed light hairline cracks or "craze" in 3 cycles or less, which generally got worse with prolonged cycling.

EXAMPLE 4

Without the Heloxy diepoxide resin modifier

A less preferred formulation employs the same recipe of Example 3, except omitting the Heloxy diepoxide resin modifier. A half-sized batch was prepared with 200 g Component B with 200 g MEK, heated to 33° C. before addition of 250 g preweighed Component A, then heated to 50° C., with the heat removed and stirring maintained until 5 minutes' elapsed time and quenched with 426 g of MEK from the freezer. The separately-blended solvent was 110 g ethanol, 35 g diacetone alcohol, and 0.9 g FC430. The resulting mix measured 20% solids.

The "Example 4"-dipcoated polycarbonate lenses were clear and smooth, and of good appearance, after 60° C. oven drydown (<10 minutes tackfree time). After C stage full cure, good film hardness was seen in steel wool test, but with more frictional drag than "Example 3".

EXAMPLE 5

With Reduced % Heloxy diepoxide resin modifier

A second variation of Example 3 was made in another half-sized batch, but differing only in that 31.3 g of Heloxy modifier was added, so that a 8:1 weight ratio of Component A to Beloxy was obtained, instead of 4:1.

The "Example 5"-dipcoated polycarbonate lenses were clear and smooth, and of good appearance, after 60° C. oven drydown (<10 minutes tackfree time). After C stage full cure, good-to-very-good film hardness was seen in steel wool test, with less frictional drag than "Example 4".

COMPARATIVE EXAMPLE 6

Treadway Version #1

Component A was prepared in accordance with Treadway's Example 4 at 0.1 batch scale. Treadway Component B was prepared in accordance with Example 3, at 0.1 batch scale. According to Treadway, Column 10, Line 1–2 . . . "the preferred ratio of epoxide to amino silane is 0.6–1.8:1", and he gives little clue otherwise. However, theoretical maximum crosslink density would be at equimolar ratios, so 25 g of Component B=37.3 g of Component A on a dry weight basis was chosen to be used. Treadway Example 3 not only hydrolizes the amino silane but also forms the ketimine by addition of MEK, with the resulting "nonvolatile %" being 35%. Treadway Example 4 similarly is reduced to "35% nonvolatile" with MEK addition. In accordance with Treadway, Column 10, Lines 12–16, no aging time was employed in the resulting reaction mixture. This "instant mix" had a Cannon Fenske viscosity of 1:23 minutes and 32% solids by actual oven weight loss.

This freshly-prepared Treadway dipbath was then used, with some of the polycarbonate lenses being allowed to airdry at room temperature, while others were immediately placed in 60° C. oven until tackfree. All the airdry Treadway-dipcoated polycarbonate lenses had a uniform light whitish fog, and the lowest ⅓ of the lens (where the solvent was last to evaporate) was optically abberated, into "smile" wavy lines; this lowest part also had some "frosted glass" look. All the oven-dried Treadway-dipcoated polycarbonate lenses were clearer, but had an "orange peel" macro-texture all over, and the lowest ⅓ of the lens was even more optically abberated with "smile" wavy lines, and the coating was "mudcracked" (the film tore itself apart).

COMPARATIVE EXAMPLE 7

Preparation of Treadway Version #2

Treadway Example 14 was chosen as a second variation since it stipulates that "the coating composition was allowed to age for about one hour" before use, and since its 1.74:1 epoxide:amino silane ratio should provide large stochemetric excess, for greater film flexibility. The reaction mixture was prepared in accordance with Example 14. Polycarbonate dipcoated lenses were airdried and oven-dried, but with similar drydown flaws as with Comparative Example 6.

The Treadway Comparative Examples 6&7 all mud cracked or crazed just during the drydown and oven cure, if they had oven drydown. The room temperature drydown Treadway Comparative Examples 6&7, Versions #1&2 were so badly fogged as to be unusable, and any steel wool rubbing revealed the coating was very poorly set; they had virtually no cohesive strength. Although it was attempted to dye those, the Treadway Comparative Example lenses, the coating peeled right off the polycarbonate lens.

In an attempt to make testable lenses from Treadway, the Example 14 bath was aged and tested again, with 0, 50% and 10% added DAA. The oven-cured lenses were still orange-peeled and had heavy "smile lines".

EXAMPLE 8a–8d

Preparation of "Instant Mix" (No Bodying)

An analogous formulation of Example 4 (1.18:1 mole ratio of epoxide:amino silanes, without any resin modifiers), was prepared without any heat-bodying or heat-accelerated formation of ketimine. Equal weights of Component B and MEK were mixed at room temperature and allowed to age 24 hours. Component A was then added to this with mixing, and immediately the remaining MEK (the the blended ethanol+DAA solvent was withheld) at room temperature was also added with mixing, and the resulting dipbath was put to immediate use.

Polycarbonate lenses were dipped in this MEK-only "instant mix", and some were allowed to air dry at room temperature (labeled "Example 8a"), while others were immediately placed in 60° C. oven for heat-accelerated drydown (labeled "Example 8b").

An analogous formulation of Example 4 (1.18:1 mole ratio of epoxide:amino silanes, without any resin modifiers), was prepared without any heat-bodying or heat-accelerated formation of ketimine. Equal weights of Component B and MEK were mixed at room temperature and allowed to age 24 hours. Component A was then added to this with mixing, and immediately the remaining MEK and all the rest of the blended ethanol+DAA solvent at room temperature were also added with mixing, and the resulting dipbath was put to immediate use.

Polycarbonate lenses were dipped in this "instant mix" with blended solvent, and some were allowed to air dry at room temperature (labeled "Example 8c"), while others were immediately placed in 60° C. oven for heat-accelerated drydown (labeled "Example 8d").

The airdry "Example 8a"-dipcoated polycarbonate lenses had a heavier whitish fog than the airdry "Example 8c"-dipcoated lenses but all were objectionable, and all C stage oven cured to very soft films lacking cohesive strength. The oven-dried "Example 8b" and "Example 8d" -dipcoated polycarbonate lenses were clearer, but still foggy, and in "Example 8b" the lowest ⅓ of the lens was still optically abberated with "smile" wavy lines. "Example 8d" (with blended solvent +oven-dry) eliminated these "smile" wavy lines, but even its coatings were "mudcracked" (the film tore itself apart) after oven drydown, as did "Example 8c".

EXAMPLE 9a–9b

Room Temperature Bodying of "Instant Mix"

The same preparation procedure of the above-mentioned "Example 8c & 8d" instant mix was conducted, except that instead of immediately using the fully-mixed, formulated coating, the mix with blended ethanol & DAA solvent was allowed to age at room temperature. Lenses were dipped at intervals of elapsed time (T=0 is the "instant mix"). At each time interval, some of the dipped polycarbonate lenses were allowed to air dry, others were oven dried as before.

The airdry "Example 9a"-dipcoated polycarbonate lenses still had objectionable fog, and all cured to very soft films lacking cohesive strength.

At T=1 to 2 hours, the oven-dried "Example 9b" -dipcoated polycarbonate lenses were clear and without "smile" wavy lines, and were not "mudcracked" after oven drydown. So did the overnight-aged RT-bodied version of same with oven-drydown. After C stage full cure, good film hardness was seen in steel wool test, and 10 minutes dyeing gave 69–72% Total Light Transmission ("% TLT"), without peeling off.

EXAMPLE 10

Ketimine Formed by Acetone

An analogous formulation to "Example 9b" with 48-hour room temperature aging as the bodying step was utilized, except that instead of equal weight MEK being added to the weighed amount of Component B, the equal weight was of acetone. The rest of the formulation stayed the same.

The airdry "Example 10a"-dipcoated polycarbonate lenses still cured to soft films lacking cohesive strength.

The oven-dried "Example lob" -dipcoated polycarbonate lenses were clear and without "smile" wavy lines, and were not "mudcracked" after oven drydown. After C stage full cure, fair-to-good film hardness was seen in steel wool test, and 10 minutes dyeing gave 64% Total Light Transmission ("% TLT"), but <80% tape adhesion without crosshatch.

EXAMPLE 11

Ketimine Formed by MIBK

An analogous formulation to "Example 9b" with 48-hour room temperature aging as the bodying step was utilized, except that instead of equal weight MEK being added to the weighed amount of Component B, the equal weight was of methyl isobutyl ketone (MIBK). The rest of the formulation stayed the same. The dipbath had a very slight pink color, but it was not seen on the coated lens.

The airdry "Example 11a"-dipcoated polycarbonate lenses had light fog and still cured to soft films lacking cohesive strength, with greater frictional drag.

The oven-dried "Example 11b" -dipcoated polycarbonate lenses were clear and without "smile" wavy lines, and were not "mudcracked" after oven drydown. After C stage full cure, fair film hardness was seen in steel wool test with lesser frictional drag than airdry "Example 11a". 10 minutes dyeing gave 48% Total Light Transmission ("% TLT"), but 50% tape adhesion without crosshatch.

EXAMPLE 12

Ketimine Formed by DAA

An analogous formulation to "Example 9b" with 48-hour room temperature aging as the bodying step was utilized, except that instead of equal weight MEK being added to the weighed amount of Component B, the equal weight was of diacetone alcohol (DAA). The rest of the formulation stayed the same. The dipbath had a very slight straw yellow color, but it was not seen on the coated lens.

The airdry "Example 12a"-dipcoated polycarbonate lenses had light fog and still cured to soft films lacking cohesive strength, with greater frictional drag.

The oven-dried "Example 12b"-dipcoated polycarbonate lenses were clear and without "smile" wavy lines, and were not "mudcracked" after oven drydown. After C stage full cure, fair-to-poor film hardness was seen in steel wool test.

EXAMPLE 13

Preparation of Alternative Heloxy Modifiers

An analogous formulation of Example 3 was employed with heat bodying procedure, except that di-epoxide-functional Beloxy 68 was substituted for equal weight of Heloxy 107, and the silane ratio was changed from 1.18:1 to 1.25:1 epoxide/amino silane. These "Example 13a" dipcoated polycarbonate lens were oven-dried and C stage cured, to clear smooth films with good appearance. Good-to-very-good film hardness was seen in steel wool test, with lesser frictional drag than a "control" "Example 13" without any Heloxy. 10 minutes dyeing gave 49% Total Light Transmission ("% TLT") (vs. uncoated CR-39 "control" dyed to 23% in same test series), and a 20 minute water boil test gave 100% tape adhesion with crosshatch (vs. a "control" "Example 13" without any Heloxy had <80%).

Another analogous formulation of Example 3 was employed with heat bodying procedure, except that triepoxide-functional Heloxy 48 was substituted for equal weight of Heloxy 107, and the silane ratio was changed from 1.18:1 to 1.25:1 epoxide/amino silane. These "Example 13b" dipcoated polycarbonate lens were oven-dried and C stage cured, to clear smooth films with good appearance. Good-to-very-good film hardness was seen in steel wool test, with lesser frictional drag than a "control" "Example 13" without any Heloxy. 10 minutes dyeing gave 54% Total Light Transmission ("% TLT")(vs. uncoated CR-39 "control" dyed to 23% in same test series), and a 20 minute water boil test gave 100% tape adhesion with crosshatch (vs. a "control" "Example 13" without any Heloxy had <80%).

EXAMPLE 14

Extent of Bodying Reaction vs. Performance

In each of these tests, a head-on comparison is made against a "Treadway—Comparative Example", wherein prehydrolized silane components were formed using 75% stoichemetric amounts of water with the amino silane and also with the epoxide silane. Treadway's preferred embodiments employ 60–80% partial hydrolysis. These partially- prehydrolized silanes, Component A and Component B, were allowed to stand for at least 24 hours before use. A comparison in each case is then made with analogous samples prepared from Applicants' fully-hydrolyzed silane Component A and Component B, wherein 104% stoichemetric amount of water is employed to form each of the prehydrolized silanes, and each are allowed to stand for 24 hours before use. Both Treadway's Component A and Component B & Applicants° Component A and Component B were observed to be room-temperature storage-stable.

In each test series comparing these Treadway and Applicants' compositions with their respective differing degrees of hydrolysis, the coatings prepared employed the same solvent blends and percent solids-to-solids, to give apples-to-apples comparison. The solvent blend used throughout was a mixture of methyl ethyl ketone and ethanol, along with diacetone alcohol as tail solvent, as reported in Applicants' Example 3. As a reference-point "control", dipcoated polycarbonate lenses prepared in accordance with Applicants' Example 3 were employed for comparison purposes, since it had previously proven excellent performance in the water-boil tests. Refer to Example 3 for details.

In each test series, the extent of room-temperature bodying was another independent variable being measured.

After dipping the polycarbonate lens in the respective liquid sample, in each case drydown was made in accordance with Applicants' teachings. Specifically, no attempt was made to air dry the liquid coatings at ambient conditions, since a "quickie" test reconfirmed previously-reported bad results. Therefore, freshly-dipped lenses were directly placed into a lab oven for heat-accelerated drydown at, typically, 50°–80° C., until a firm tackfree coating had set itself. Then, these B-Stage lenses were transferred to batch cure, into a C-Stage cure oven set at 110°–120° C., for varying periods of time ranging from 4 hours to 12 hours.

In an early test series, the coating films were excessively thick, causing all to fail quickly cohesively, either during oven curing or in 15-minute water-boil tests. Therefore, it was found that subsequent tests need to put on lower percent solids, typically 20–35% range, in order to provide a cured film thickness thick enough for excellent scratch resistance, but thin enough to resist cohesive failure.

Later test series ran a head-on comparison of the Treadway compositions and Applicants' compositions, each of which had a silane only (no diepoxide resin modifiers), in which case the ratio of prehydrolized silanes was 2:1 epoxide to amino ratio, by weight. This test series was then contrasted with an analogous series, wherein a nonvolatile filmformer composition of the Applicants' Example 3 was chosen as model (1.18:1, epoxide/amino mole ratio, with a Component A/diepoxide resin modifier blend in the ratio of 4:1 by weight). In this test series, Component B's prehydrolized aminosilane is mixed with equivalent weight of methyl ethyl ketone and let stand at room temperature for 1 hour in order for ketimine to form. This same ketimine-formation step was then used throughout all subsequent test series of these experiments. After the one-hour ketimine-formation time had passed, then Component A and Component B prehydrolized silanes are mixed and immediately diluted with preblended solvent to the desired percent solids, and a timer is started, to measure room-temperature bodying time. At periodic intervals, a polycarbonate lens sample is then dipped in the liquid coating and heat-dried and heat-cured, as previously specified, and then evaluated in the water-boil performance test.

A follow-up test series was conducted with the same dipcoating liquid compositions after storage 5 days in a freezer.

In another test series, both Treadway and Applicants' compositions employed the same nonvolatile ratios of Applicants' Example 3, including the mole ratio of the silane prehydrolizates and the ratio of Component A to the diepoxide resin modifier. This comparison of the respective 75% hydrolysis and 104% hydrolysis was then run with varying bodying times at room temperature, as well as different percent solids, each using the same blended solvent compositions, as mentioned previously.

Another variable employed combined the A and B components by themselves without the solvent dilution shown in all of Treadway's examples, for times ranging 15–60 minutes, at which time a maximum concentration of reactants is occurring at this room-temperature bodying, before finally being diluted with the preblended solvents. Then, after that, bodying timers were started and additional samples taken periodically.

TEST RESULTS

A. Coating cohesive film failure through cracking or crazing almost always precedes delamination failure. Coated lens samples showing crazing after the 15-minute water-boil tests almost always had perfect adhesion, as measured by crosshatch tape-pull, but when subjected to successive additional 15-minute water-boil immersions, the cracking and crazing propagated, as one would expect, and soon, peeling of the coating off the polycarbonate substrate was observed.

B. In every case of room-temperature bodying less than or equal to 1 hour, the 15-minute water-boil performance test was failed.

C. In most cases of failure, the matched pairing of Treadway 75% hydrolyzed and Applicants' 104% hydrolyzed failed together. However, the severity of crazing was generally less and the onset of failure was generally later with Applicants' 104% hydrolyzed vs. the Treadway 75% hydrolyzed.

D. Considerable data scatter occurred between 2-hour room-temperature bodying and up to 12-hour room-temperature bodying, but the clear general trend was that longer bodying is better.

E. Dipcoated polycarbonate hardcoat films applied from greater than 35% solids had very high instance of failure. Film thickness became a very important variable in these tests.

F. In general, a longer C-Stage oven cure improved results in these performance tests.

G. The reference-point control lens of Applicants' Example 3 employed in each of the above-mentioned test series was reconfirmed, indeed, to be the preferred embodiment, withstanding multiple 15-minute immersions in boiling water successfully without cracking or peeling.

H. All samples not failing adhesively (peeling) which were applied from the preferred 20–35% solids showed good scratch resistance to steel wool rubbing.

CONCLUSIONS

Contrary to the teachings of Treadway, greater than 1 hour of room-temperature bodying is required with his preferred 60–80% partial hydrolysis, in order to raise the degree of polymerization in the liquid dipcoating sufficiently so as to pass the 15-minute water-boil performance test. Applicants' 104% full hydrolysis formulations also were found to require greater than 1 hour of room-temperature bodying in order to raise the degree of polymerization in the liquid dipcoating sufficiently so as to pass the 15-minute water-boil performance test. However, better performance was generally observed with Applicants' 104% full hydrolysis formulations, compared to Treadway's 75% partial hydrolysis formulations.

Tests with and without the polyepoxide-functional resin modifiers clearly show better performance with said modifier, although this benefit is not by itself sufficient to allow consistently passing the required 15-minute water-boil test, without the right bodying.

The general data pattern indicate a synergy between full hydrolysis and greater bodying.

Thus, when other factors are equal (effects of coating film thickness, percent solids, solvent blend composition, drydown, cure time, etc.), the general data pattern shows a criticality that a sufficient degree of polymerization is needed to pass 15-minute water-boil performance tests, and such critical degree of polymerization requires greater than 1-hour room-temperature bodying can provide, even in the presence of the preferred polyepoxide-functional resin modifier and the preferred fully-hydrolized silane Components A and B.

COMPARATIVE EXAMPLE 15

Sallavanti

A dip bath was prepared in accordance with Sallavanti Example 1, at reduced batch size. 17.8 g of ethylene diamine was placed in reaction vessel and 192.7 g of diacetone alcohol was added and mixed. After one hour of standing at room temperature, 100 g of prehydrolized epoxide silane (95% stoichemetry with water) was added to the mix for a 2:1 mole ratio of epoxy silane to ethylene diamine. After one hour, the reaction is quenched by addition of 41 g of additional DAA from freezer, and thoroughly mixed before being stored for 4 hours in the freezer. To this freezer-aged mix was then added 41.4 ml of n-butanol, 55 ml of isopropanol, and 2 drops of FC 430 surfactant. This bath was filled to the recommended 30° F., and Cannon Fenske viscosity of 5:10 and 220w solids by weight loss was measured. Polycarbonate lenses were then dipped and some were given room temperature drydown; others were immediately placed in 70° C. oven. All the samples were unacceptably and irreversibly fogged, but the room-temperature drydown samples were by far the worst. Even the oven drydown samples were not tackfree well after 10 minutes in the oven. C-stage 120° C. final cure didn't make these lenses any clearer.

It spite of coated lenses being so fogged as to be rendered useless optically, it was attemped to run comparative performance tests on the lenses. The Sallivanti room-temperature drydown lenses had virtually no cohesive strength or dry adhesion under steel wool rubs. When immersed in BPI dye for 10 minutes, the coating lost adhesion and fell off. The oven drydown samples were better but failed also.

We claim:

1. A heat-curable liquid hardcoating solution composition of matter suited for dipcoating polycarbonate spectacle lens, prepared by mixture of Component AB', C, and D comprising:

a. a epoxide-functional silane liquid hydrolyzate formed by hydrolysis of an epoxide-functional trialkoxy silane by stoichemetric excess water, as a room-temperature-storage-stable Component A;

b. an amino-functional silane liquid hydrolyzate formed by hydrolysis of an aminofunctional trialkoxy silane by stoichemetric excess water, as a room-temperature-storage-stable Component B;

said amino-functional silane liquid hydrolyzate being further reacted with at least stoichemetrically excess ketone to form a ketimine silane liquid hydrolyzate Component B', wherein Component A and Component B' are mixed to form a mixture and undergo a bodying reaction, said bodying reaction between Component B' and Component A having attained at least a minimum degree of polymerization equal to a degree of polymerization attained by a room temperature mixture of Component B' and Component A aged 1 hour, and furthering the bodying reaction by exceeding said minimum degree of polymerization by aging for greater than 1 hour, thereby forming Component AB';

c. at least two solvents consisting of at least one ketone and at least one alcohol having a slower evaporation rate than said ketone, as Component C;

d. at least one polyfunctional organic resin modifier selected from a group having at least two or more epoxide-functional groups per molecule, as Component D;

such that a polycarbonate spectacle lens dipped into said heat-curable liquid hardcoating solution prepared by mixing Component AB', C and D, being subsequently heat-dried and heat-cured, passes a hardcoated lens performance test consisting of boiling water immersion for 15 minutes without cohesive film failure by cracking or crazing, or adhesive film failure by peeling or delamination by crosshatch tape pull, while said polycarbonate spectacle lens having been dipcoated, heat-dried and heat-cured, also has good scratch resistance in a steel wool abrasion test.

2. A composition of matter of claim 1 wherein furthering the bodying reaction between Component B' and Component A at room temperature takes 2 to 16 hour to reach a desired degree of polymerization.

3. A composition of matter of claim 1, wherein said epoxide-functional trialkoxy silane is glycidoxy propyl trimethoxy silane and wherein said amino-functional trialkoxy silane is aminopropyl triethoxy silane.

4. A composition of matter of claim 1, wherein said amino-functional silane liquid hydrolyzate is further reacted with at least stoichemetrically excess methyl ethyl ketone, to form a ketimine silane liquid hydrolyzate Component B'.

5. A composition of matter of claim 1, wherein a mole ratio of said epoxide-functional trialkoxy silane being a starting material for Component A and said amino-functional trialkoxy silane being a starting material for Compound B is between 8:1 to 2:1, when said bodying reaction forms Component AB'.

6. A composition of matter of claim 1, wherein one of said at least two solvents consisting of at least one ketone and at least one alcohol having a slower evaporation rate than said ketone, as Component C, is diacetone alcohol.

7. A composition of matter of claim 1, wherein said at least one polyfunctional organic resin modifier selected from a group having at least two or more epoxide-functional groups per molecule, as Component D, is diglycidyl ether of cyclohexane dimethanol.

8. A composition of matter of claim 1, wherein said at least one polyfunctional organic resin modifier selected from a group having at least two or more epoxide-functional groups per molecule, as Component D, is trimethylol propane triglycidyl ether.

9. A composition of matter of claim 1, wherein said at least one polyfunctional organic resin modifier selected from a group having at least two or more epoxide-functional groups per molecule, as Component D, is trimethylol propane triglycidyl ether.

10. A heat-curable liquid hardcoating solution composition of matter suited for dipcoating polycarbonate spectacle lens, prepared by mixture of Components AB', C, and D comprising:
   a. a epoxide-functional silane liquid hydrolyzate formed by hydrolysis of an epoxide-functional trialkoxy silane by stoichemetric excess water, as a room-temperature-storage-stable Component A;
   b. an amino-functional silane liquid hydrolyzate formed by hydrolysis of an aminofunctional trialkoxy silane by stoichemetric excess water, as a room-temperature-storage-stable Component B;
   said amino-functional silane liquid hydrolyzate being further reacted with at least stoichemetrically excess ketone to form a ketimine silane liquid hydrolyzate Component B',
   wherein Component A and Component B' are mixed to form a mixture and undergo a bodying reaction, said bodying reaction between Component B' and Component A having attained at least a minimum degree of polymerization equal to a degree of polymerization attained by a room temperature mixture of Component B' and Component A aged 1 hour,
   exceeding said minimum degree of polymerization by a heat accelerated bodying reaction, by warming said mixture of Component B' and Component A to a 30–60 degrees C. temperature range and aged for a shorter time than 1 hour, thereby forming Component AB';
   c. at least two solvents consisting of at least one ketone and at least one alcohol having a slower evaporation rate than said ketone, as Component C;
   d. at least one polyfunctional organic resin modifier selected from a group having at least two or more epoxide-functional groups per molecule, as Component D;
   such that a polycarbonate spectacle lens dipped into said heat-curable liquid hardcoating solution prepared by mixing Component AB', C, and D, being subsequently heat-dried and heat-cured, passes a hardcoated lens performance test consisting of boiling water immersion for 15 minutes without cohesive film failure by cracking or crazing, or adhesive film failure by peeling or delamination by crosshatch tape pull, while said polycarbonate spectacle lens having been dipcoated, heat-dried and heat-cured, also has good scratch resistance in a steel wool abrasion test.

11. A composition of matter of claim 10, wherein said epoxide-functional trialkoxy silane is glycidoxy propyl trimethoxy silane and wherein said amino-functional trialkoxy silane is aminopropyl triethoxy silane.

12. A composition of matter of claim 10, wherein said epoxide-functional silane liquid hydrolyzate is further reacted with at least stoichemetrically excess methyl ethyl ketone, to form a ketimine silane liquid hydrolyzate Component B'.

13. A composition of matter of claim 10, wherein a mole ration of said epoxide-functional trialkoxy silane being a starting material for Component A and said amino-functional trialkoxy silane being a starting material for Component B is between 8:1 and 2:1, when said bodying reaction forms Component AB'.

14. A composition of matter of claim 10, wherein one of said at least two solvents consisting of at least one ketone and at least one alcohol having a slower evaporation rate than said ketone, as Component C, is diacetone alcohol.

15. A composition of matter of claim 10, wherein said at least one polyfunctional organic resin modifier selected from a group having at least two or more epoxide-functional groups per molecule, as Component D, is diglycidyl ether of cylohexane dimethanol.

16. A method for preparing liquid heat-curing hard coating solution suitable for dipcoating polycarbonate spectacle lenses, comprising the steps of:
   a. preparing separately two room-temperature-storage-stable Components A and B, by:
      i) fully hydrolizing with a stoichemetric excess of water the alkoxy groups of a an epoxide-functional trialkoxy silane, as Component A;
      ii) fully hydrolizing with a stoichemetric excess of water the alkoxy groups of an amino-functional trialkoxy silane, as Component B;
   b. reacting said Component B with stoichemetrically excess molar amounts of at least one ketone, to form a ketimine silane liquid hydrolyzate Component B';
   c. mixing Component A and Component B' to form mixture and undergo a bodying reaction, to attain at least a minimum degree of polymerization equal to a degree of polymerization attained by a room temperature mixture of Component B' and Component A aged 1 hour,
   and furthering the bodying reaction by exceeding said minimum degree of polymerization by aging for greater than 1 hour, thereby forming Component AB';
   d. diluting Component AB' with at least two solvents consisting of at least one ketone and at least one alcohol having a slower evaporation rate than said ketone, said at least two solvents being Component C;
   e. adding into Component AB' at least one polyfunctional organic resin modifier selected from a group having at least two or more epoxide-functional groups per molecule, said at least one polyfunctional organic resin modifier being Component D;
   such that a polycarbonate spectacle lens dipped into said hardcoating solution prepared by mixing Components AB', C, and D, being subsequently heat-dried and heat-cured, passes a hardcoated lens performance test consisting of boiling water immersion for 15 minutes without cohesive film failure by cracking or crazing, or adhesive film failure by peeling or delamination by crosshatch tape pull, while said polycarbonate spectacle lens having been dipcoated, heat-dried and heat-cured, also has good scratch resistance in a steel wool abrasion test.

17. A method of claim 16, wherein said Component D is mixed with said Component A before both are reacted in said bodying step with said Component B'.

18. A method of claim 16, wherein the step of preparing separately two room-temperature-storage-stable Component A and B by hydrolysis has been preceding by the step of reacting said amino-functional trialkoxy silane with stoichemetrically excess molar amounts of at least one ketone, to form a ketimine trialkoxy silane, before fully hydrolizing ketimine trialkoxy silane with stoichemetric excess water for the alkoxy groups, to form liquid hydrolyzate Component B'.

19. A method of claim 16, wherein said polycarbonate spectacle lenses are dipped into and withdrawn from said liquid heat-curing hard coating solution, then the wet dipped lenses are immediately heated to accelerate a drydown process for evaporating all volatile solvents and gelling the devolatized hardcoating onto said polycarbonate spectacle lens to a tack-free state, and are then heatcured at 110–120 degree C. for 4–8 hours.

20. A method of claim 16, wherein step d., diluting Component AB' with at least two solvents consisting of at least one ketone and at least one alcohol having a slower evaporation rate than said ketone, said at least two solvents being Component C, is done before or concurrent to step c., bodying to form Component AB', so as to have pre-diluted Component AB' with Component C during the bodying step c.

21. A method for preparing liquid heat-curing hard coating solution suitable for dipcoating polycarbonate spectacle lenses, comprising the steps of:
   a. preparing separately two room-temperature-storage-stable Components A and B, by:
      i) fully hydrolizing with a stoichemetric excess of water the alkoxy groups of a an epoxide-functional trialkoxy silane, as Component A;
      ii) fully hydrolizing with a stoichemetric excess of water the alkoxy groups of an amino-functional trialkoxy silane, as Component B;
   b. reacting said Component B with stoichemetrically excess molar amounts of at least one ketone, to form a ketimine silane liquid hydrolyzate Component B';
   c. mixing Component A and Component B' to form mixture and undergo a bodying reaction, to attain at least a minimum degree of polymerization equal to the degree of polymerization attained by a room temperature mixture of Component B' and Component A aged 1 hour, and furthering the bodying reaction by exceeding said minimum degree of polymerization by warming said mixture of Component B' and Component A to a 30–60 degree C. temperature range and aging for shorter than 1 hour, thereby forming Component AB';
   d. diluting Component AB' with at least two solvents consisting of at least one ketone and at least one alcohol having a slower evaporation rate than said ketone, said at least two solvents being Component C;
   e. adding into Component AB' at least one polyfunctional organic resin modifier selected from a group having at least two or more epoxide-functional groups per molecule, said at least one polyfunctional organic resin modifier being Component D;
   such that a polycarbonate spectacle lens dipped into said heat-curable liquid hardcoating solution prepared by mixing Components AB', C, and D, being subsequently heat-dried and heat-cured, passes a hardcoated lens performance test consisting of boiling water immersion for 15 minutes without cohesive film failure by cracking or crazing, or adhesive film failure by peeling or delamination by crosshatch tape pull, while said polycarbonate spectacle lens having been dipcoated, heat-dried and heat-cured, also has good scratch resistance in a steel wool abrasion test.

22. A method of claim 21, wherein said Component D is mixed with said Component A before both are reacted in said bodying step with said Component B'.

23. A method of claim 21, wherein the step of preparing separately two room-temperature-storage-stable Component A and B by hydrolysis has been preceding by the step of reacting said amino-functional trialkoxy silane with stoichemetrically excess molar amounts of at least one ketone, to form a ketimine trialkoxy silane, before fully hydrolizing ketimine trialkoxy silane with stoichemetric excess water for the alkoxy groups, to form liquid hydrolyzate Component B'.

24. A method of claim 21, wherein said polycarbonate spectacle lenses are dipped into and withdrawn from said liquid heat-curing hard coating solution, then the wet dipped lenses are immediately heated to accelerate a drydown process for evaporating all volatile solvents and gelling the devolatized hardcoating onto said polycarbonate spectacle lens to a tack-free state, and are then heatcured at 110–120 degree C. for 4–8 hours.

* * * * *